(12) United States Patent
Gardner et al.

(10) Patent No.: US 11,288,641 B2
(45) Date of Patent: Mar. 29, 2022

(54) VEHICLE VALUE AS A TOKEN

(71) Applicant: TOYOTA MOTOR NORTH AMERICA, INC., Plano, TX (US)

(72) Inventors: Mathew D. Gardner, Lewisville, TX (US); Shravanthi Denthumdas, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 123 days.

(21) Appl. No.: 16/363,181

(22) Filed: Mar. 25, 2019

(65) Prior Publication Data
US 2020/0311698 A1 Oct. 1, 2020

(51) Int. Cl.
*G06Q 20/06* (2012.01)
*G06Q 20/36* (2012.01)
*G07C 5/08* (2006.01)
*H04L 9/06* (2006.01)
*G07C 5/00* (2006.01)

(52) U.S. Cl.
CPC ..... *G06Q 20/0652* (2013.01); *G06Q 20/0658* (2013.01); *G06Q 20/3672* (2013.01); *G07C 5/008* (2013.01); *G07C 5/0841* (2013.01); *H04L 9/0637* (2013.01); *H04L 9/0643* (2013.01)

(58) Field of Classification Search
None
See application file for complete search history.

(56) References Cited

U.S. PATENT DOCUMENTS

| | | |
|---|---|---|
| 9,794,789 B1 | 10/2017 | Coney |
| 2013/0325579 A1 | 12/2013 | Salmon et al. |
| 2017/0236143 A1 | 8/2017 | Code et al. |
| 2019/0172026 A1* | 6/2019 | Vessenes ............... H04L 9/3247 |
| 2019/0287079 A1* | 9/2019 | Shiraishi ............... G07C 5/008 |

(Continued)

OTHER PUBLICATIONS

Kei Leo Brousmiche, et al., "Digitizing, Securing and Sharing Vehicles Life-cycle Over a Consortium Blockchain: Lessons Learned", IEEE 9th IFIP International Conference on New Technologies, Mobility and Security (NTMS), Feb. 2018, pp. 1-5.

(Continued)

*Primary Examiner* — Jamie R Kucab
(74) *Attorney, Agent, or Firm* — Oblon, McClelland, Maier & Neustadt, L.L.P,

(57) ABSTRACT

A system and method for tracking and validating value of a vehicle, includes a memory device, a wireless communication device, authentication processor that authenticates the vehicle and generates one or more security keys, and a processor maintaining a token linked to the vehicle that designates the vehicle as a stake. The processor executes instructions to when a condition change event of the vehicle occurs, receive information of a change of state from the vehicle, generate a message including the change of state information, sign the message with a private key, transmit the signed message using the wireless communication device, choosing a node of a blockchain distributed network, evaluating, via the chosen node, the signed message in accordance with distributed contract rules to determine an updated token value and a residual token, and receive and maintain the updated token value and the residual token.

18 Claims, 4 Drawing Sheets

(56) References Cited

U.S. PATENT DOCUMENTS

| | | | |
|---|---|---|---|
| 2020/0106623 A1* | 4/2020 | Andreina | H04L 9/0891 |
| 2020/0172112 A1* | 6/2020 | Kawashima | B60K 28/02 |
| 2020/0344132 A1* | 10/2020 | Padmanabhan | H04L 9/0643 |
| 2021/0042841 A1* | 2/2021 | Floyd | H04L 63/1408 |
| 2021/0163030 A1* | 6/2021 | Lerzer | B60R 16/0231 |

OTHER PUBLICATIONS

Yong Yuan, et al., "Towards Blockchain-based Intelligent Transportation Systems", IEEE 19th International Conference on Intelligent Transportation Systems (ITSC), Nov. 1-4, 2016, pp. 2663-2668.

* cited by examiner

VEHICLE VALUE AS A TOKEN

BACKGROUND OF THE INVENTION

Field of the Invention

The present invention relates generally to a system and method of blockchain proof of stake backed by a token value attached to a purchased product, and in particular a vehicle, or parts of a vehicle, and the stake can earn value and support security of the blockchain.

Description of the Related Art

A blockchain system is a system of decentralized nodes (computers for confirming transactions occurring on the network and maintaining a decentralized consensus across the system). The nodes are provided with an incentive to participate in confirmation of transactions. Various consensus algorithms have been proposed for blockchain systems that seek to efficiently and securely maintain the blockchain. The Bitcoin blockchain uses a proof of work consensus algorithm. The proof of work consensus algorithm often referres to the nodes as miners. Miners perform a process that involves hashing of data. The hashing processes that is performed is computationally intensive and is generally performed using a computer having a powerful graphics processing unit (GPU). Block data in Bitcoin contains a set of chronological transactions, the hash of the previous block, a timestamp, and a nonce. The hash used in Bitcoin is the SHA-256 hash algorithm. Miners evaluate the value of the nonce by trial and error to achieve a hash value of the block data, which is referred to as work. The miner that obtains the right value of the nonce first gets rewarded. This work of miners takes a lot of electrical energy and computing cycles to perform.

Another consensus algorithm for maintaining a blockchain is proof of stake. Proof of stake uses much less energy and computing power than proof of work. The proof of stake consensus algorithm uses a different name for nodes, such as validator. In proof of stake, a validator is selected and honesty is encouraged by what is at stake for the validator. In other words, a validator stakes a cryptocurrency of the blockchain network in which they participate. Validators may be nominated to verify a transaction and get a reward for being selected. The validator creates a new block for the blockchain. The algorithm ensures honesty in that on evidence of corrupt behavior or manipulation, a validator's staked cryptocurrency can be taken away by the governing mechanism of the blockchain. In other words, unlike miners in proof of work, validators do not compete for a block reward, but instead are chosen based on their wealth to create a new block and receive a reward for being selected.

Most vehicles depreciate in value based on the age of the vehicle and factors such as miles driven, visual condition of the vehicle, accident history, and maintenance history. Owners of vehicles may use their vehicle for commuting to work, performing errands, traveling, etc. without giving much thought in how their usage affects the value of the vehicle. Many owners may not consider the value of their vehicle until they go to sell the vehicle. Often some of these factors are not recorded or may be maintained in independent disparate databases. For example, information on driving conditions or flooding may not be recorded anywhere. Information on vehicle maintenance may be maintained in databases used at various stations that the vehicle may have been serviced. Similarly, information on accidents may be maintained in databases at various facilities. In some cases even information on vehicle maintenance may not be stored in a database.

At the same time, vehicle owners may not pay attention to factors that may affect the condition, and subsequently value, of a vehicle. Vehicle owners may choose to put off maintenance until they believe it is necessary or until problems occur. Vehicle owners may not report minor accidents. Work on a vehicle, such as replacing a vehicle's engine may result in resetting the miles, and subsequently, actual vehicle miles traveled may not be accurate or may be unavailable. Vehicle owners may choose to drive their vehicle in driving conditions that can negatively impact the condition of the vehicle.

There is a need for a mechanism that tracks vehicle usage and resulting changes in vehicle value and that provides an incentive for vehicle owners to improve awareness of vehicle value over time and thereby seek to maximize the vehicle value. It is noted, that although this disclosure uses a vehicle as an example, the disclosure is not limited to vehicles. The disclosed method may apply to other purchased items that have value that change over time.

SUMMARY OF THE INVENTION

A system and method for tracking and validating value of a vehicle, includes a memory device, a wireless communication device, authentication processor that authenticates the vehicle and generates one or more security keys, and a processor maintaining a token linked to the vehicle that designates the vehicle as a stake. The processor executes instructions to when a condition change event of the vehicle occurs, receive information of a change of state from the vehicle, generate a message including the change of state information, sign the message with a private key, transmit the signed message using the wireless communication device, choosing a node of a blockchain distributed network, evaluating, via the chosen node, the signed message in accordance with distributed contract rules to determine an updated token value and a residual token, and receive and maintain the updated token value and the residual token.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
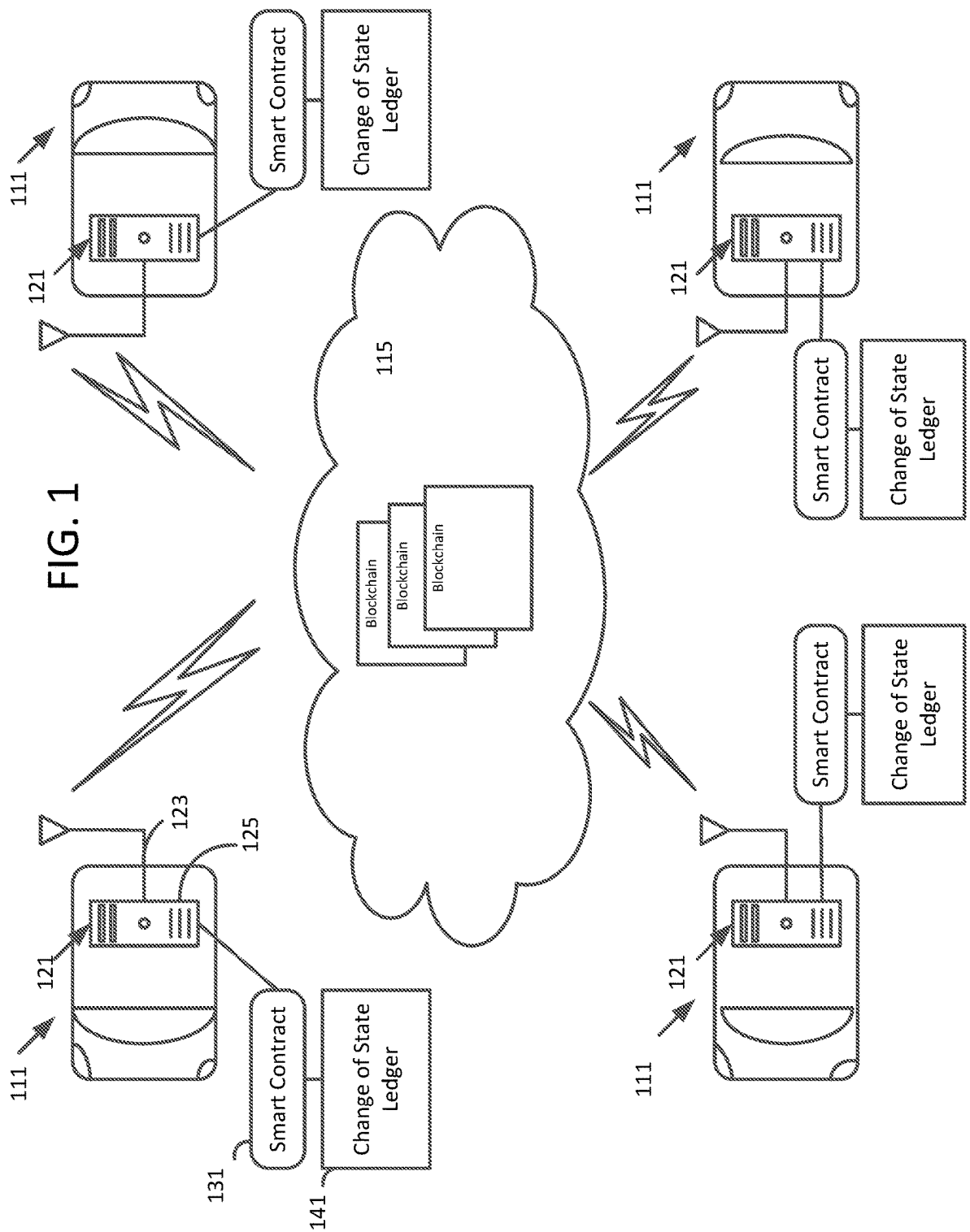
FIG. 1 is a block diagram for a blockchain system having vehicle nodes.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Referring now to the drawings, wherein like reference numerals designate identical or corresponding parts throughout the several views. In proof of stake, honesty is encouraged by what is at stake for the validator. In other words, a validator stakes a cryptocurrency of the blockchain network in which they participate. The proof of stake algorithm ensures honesty in that on evidence of corrupt behavior or manipulation, a validator's staked cryptocurrency can be taken away by the governing mechanism of the blockchain. Validators may be nominated to verify a transaction and get a reward for being selected. The validator creates a new block for the blockchain.

FIG. 1 is a block diagram for a blockchain system having vehicle nodes in accordance with an exemplary aspect of the disclosure. Upon purchasing of a vehicle 111, in a proof of stake blockchain system 115 a purchaser may provide the vehicle or vehicle title as a stake in the blockchain. A vehicle owner may agree to terms of a smart contract 131 and may create a new block 141 based on a change of state of the vehicle. Authentication co-processor 125 (a secure enclave) authenticates the vehicle, and generates and maintains one or more security keys. Computer 121 generates a message including a change of state of the vehicle and a wireless communication device 123 transmits a message to the blockchain.

Figure 2:
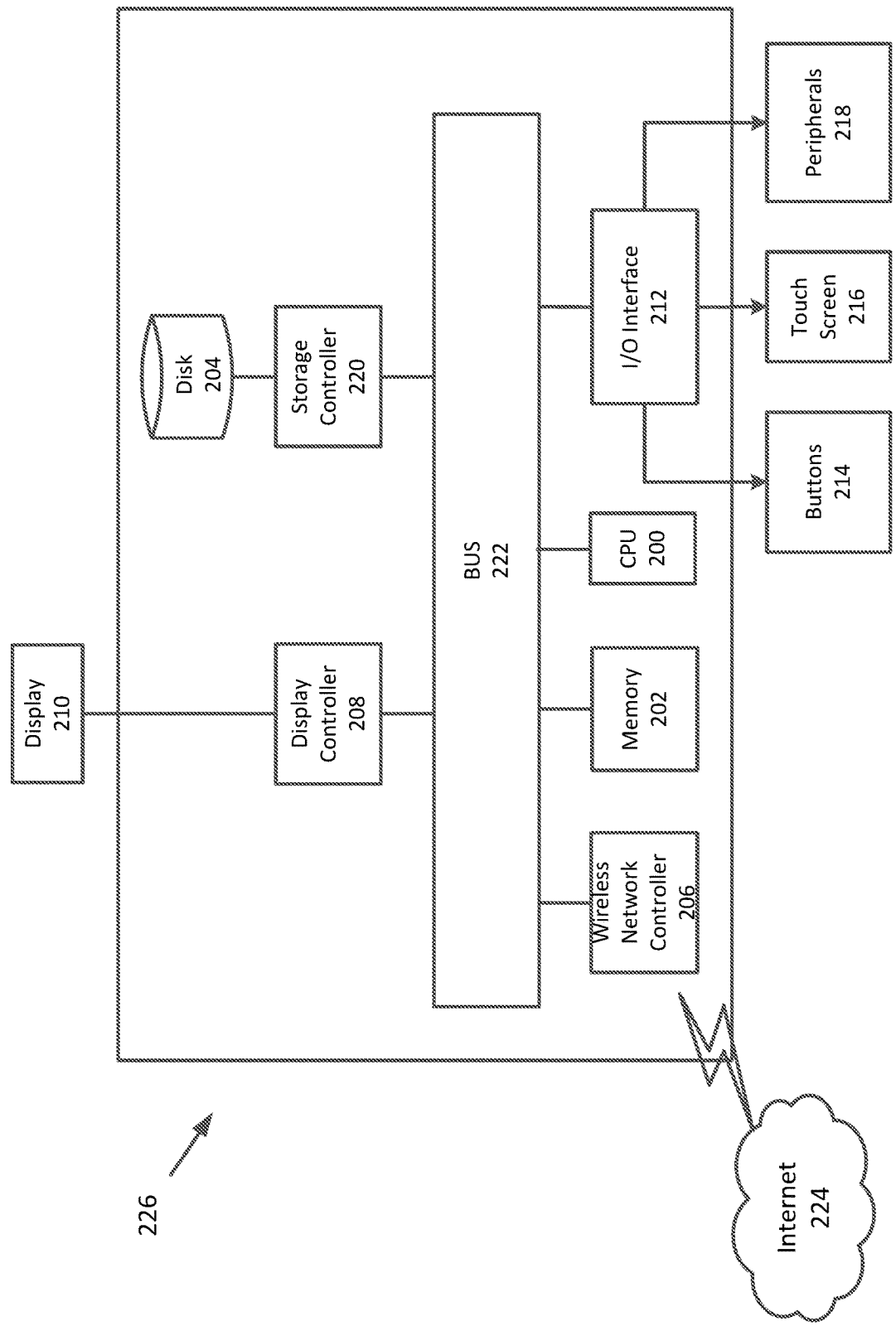
FIG. 2 is a block diagram of a vehicle node.

In one embodiment, the functions and processes of the computer 121 may be implemented by a computer 226. A hardware description of the computer 226 according to exemplary embodiments is described with reference to FIG. 2. In FIG. 2, the computer 226 includes a CPU 200 which performs the processes described herein. The process data and instructions may be stored in memory 202. These processes and instructions may also be stored on a storage medium disk 204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 226 communicates, such as a server or computer.

Further, the claimed advancements may be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In order to achieve the computer 226, the hardware elements may be realized by various circuitry elements, known to those skilled in the art. For example, CPU 200 may be a Xenon® or Core® processor from Intel Corporation of America or an Opteron® processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The computer 226 in FIG. 2 also includes a wireless network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network, or can be wireless such as a cellular network including EDGE, 3G and 4G wireless cellular systems. The wireless network can also be WiFI®, Bluetooth®, or any other wireless form of communication that is known.

The computer 226 further includes a display controller 208, such as a NVIDIA® GeForce® GTX or Quadro® graphics adaptor from NVIDIA Corporation of America for interfacing with display 210, such as a Hewlett Packard® HPL2445w LCD monitor. A general purpose I/O interface 212 interfaces with a keyboard and/or mouse 214 as well as an optional touch screen panel 216 on or separate from display 210. General purpose I/O interface also connects to a variety of peripherals 218 including printers and scanners, such as an OfficeJet® or DeskJet® from Hewlett Packard®.

The general purpose storage controller 220 connects the storage medium disk 204 with communication bus 222, which may be an ISA, EISA, VESA, PCI, or similar, for interconnecting all of the components of the computer 226. A description of the general features and functionality of the display 210, keyboard and/or mouse 214, as well as the display controller 208, storage controller 220, wireless network controller 206, and general purpose 110 interface 212 is omitted herein for brevity as these features are known.

Figure 3:
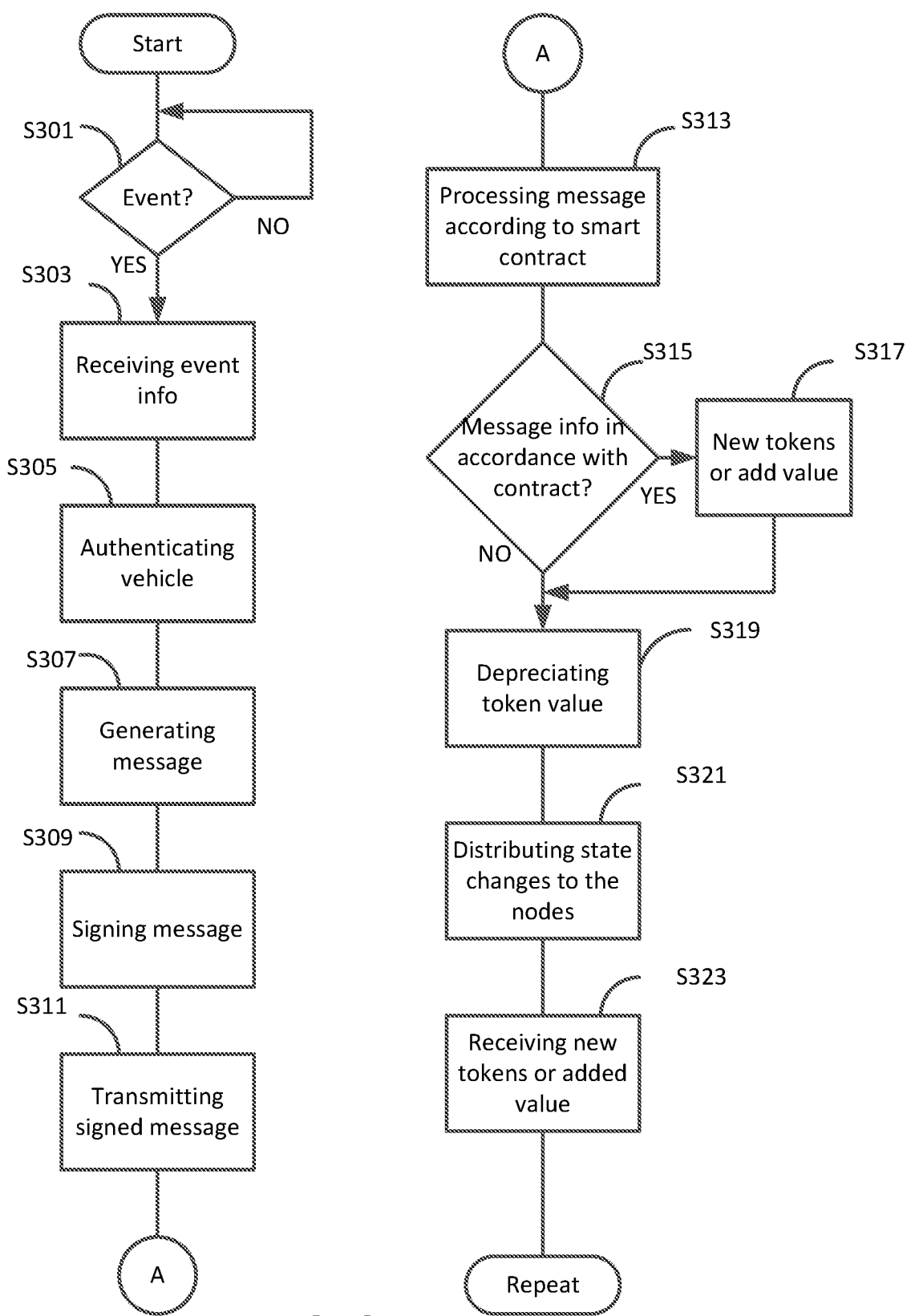
FIG. 3 is a flowchart for the vehicle node.

FIG. 3 is a flowchart for a vehicle node in accordance with an exemplary aspect of the disclosure. The blockchain system links a token with a vehicle to relate the value of the token with the vehicle. The vehicle token is non-fungible, and thus represents a non-liquid asset. The token may also include a residual token. A residual token may be a token granted as a reward, for example, as a reward for good driving. The vehicle may depreciate in value according to a predetermined vehicle depreciation schedule. The value of the token linked to the vehicle may incur additional depreciation according to bow the vehicle is used. The residual token may be earned and thus offset the depreciation.

The vehicle monitors how it is being used and may report, a change of state of the vehicle. The blockchain may respond with an updated token or a new token that reflects a value of the token as a result of the change of state. The vehicle may report a number of miles driven within a predetermined period of time as a change of state. For example, the vehicle may report that 3000 miles have been driven since a last reported miles log and that the miles have been driven within a relatively short period of time, for example, in less than three months. The vehicle may report rough driving conditions, such as driving on a road that exhibits an excessive vibration over a predetermined period, such as a half hour to longer. The vehicle may report that it has been driven by a predetermined number of miles in excess of a recommended number of miles for routine maintenance. Also, a vehicle may report that it has been involved in an accident. In some embodiments, the vehicle may report specific parts of a vehicle that are repaired or replaced as a result of an accident, may report a category of accident, such as minor fender damage, medium body damage, or major drive-train damage. Messages reporting a state of a vehicle may be sent periodically, such as every predetermined number of miles driven, or every predetermined period of time, or upon occurrence of a specific event that involves a change of state. For purposes of this disclosure, any of a predetermined number of miles driven, predetermined period of time, or occurrence of an event that involves a change of state will be considered as state change event, or simply an event for ease of understanding.

Regarding FIG. 3, in S301 (YES), upon occurrence of an event that requires reporting of a change of state of a vehicle, in S303, the computer 121 for the vehicle will receive change of state information concerning the event. For example, information concerning an event may include state changes such as miles driven per time period, excess miles driven without scheduled maintenance, occurrence of an accident, driving in rough driving conditions. In S305, a secure enclave processor 125 authenticates the vehicle. In S307, the computer 121 generates a message that includes the change of state information of the vehicle. In S309, the enclave processor 125 retrieves a private key from a secure storage of the secure enclave, and the computer 121 signs the message with the private key. In S311, the message having state changes is transmitted via the wireless communication device 123 to the blockchain 115.

In some embodiments, one or more messages may be buffered while the vehicle and/or computer 121 is offline. The message(s) may then be sent at a time when the vehicle is started up, or in the case of an electric vehicle, the vehicle is plugged in and has been charged to a predetermined charge level. All messages since last communication may be transmitted to the blockchain 115. In S313, a block is created for a state change in accordance with a smart contract 131. In S319, the blockchain 115 may issue an updated token or in S317 new tokens based on the state change and the rules of the smart contract 131. In S321, every vehicle that is a member of the blockchain 115 receives a copy of the state change(s) 141. In S323, the vehicle that sent out the original message receives an updated token value or new tokens. The computer 121 will repeat reporting of state changes and receiving updated token values over the course of usage of the vehicle by the owner.

In addition to an updated token value or new tokens, residual tokens may be issued as a reward for good driving behavior. In some embodiments, a residual token may be granted by a third party, who offers residual tokens as a market incentive. For example, when a vehicle reaches a predetermined number of miles without an accident, the blockchain 115 may issue a residual token. Residual tokens may be issued when maintenance is performed on schedule, or when the vehicle is driven in safe or good driving conditions over a predetermined number of miles. Residual tokens may also be issued for exceptional care of a vehicle. For example, residual tokens may be issued when a vehicle is driven only on weekends, or in a case where a combination of low miles is driven and maintenance is performed on schedule, or where the vehicle is stored in a facility, such as a garage or warehouse having a controlled environment, for a predetermined period of time. Such residual tokens may be granted by a third party, such as an insurance company or rental agency, to provide an incentive for good driving and care of the vehicle.

In the case that a vehicle is to be transferred to a new owner, the value of the vehicle will be indicated by the value of the linked token which reflects the blockchain of state changes and any offset value of residual tokens.

In some embodiments, initially, a vehicle, proportion of a vehicle, or parts of a vehicle are put up for stake when a vehicle is purchased. In the case that a proportion of a vehicle is put up for stake, the vehicle may be co-owned or leased. In the case that parts of a vehicle are put up for stake, the parts may be replacement parts or upgrades that the owner has purchased.

The proof of stake mechanism includes conditions where an entire stake may be lost. When a computer 121 of a vehicle attempts to modify one or more rules of the smart contract, the entire stake may be reduced to zero. When a computer 121 of a vehicle attempts to modify the change of state information that is provided by the vehicle, the entire stake may be reduced to zero.

Figure 4:
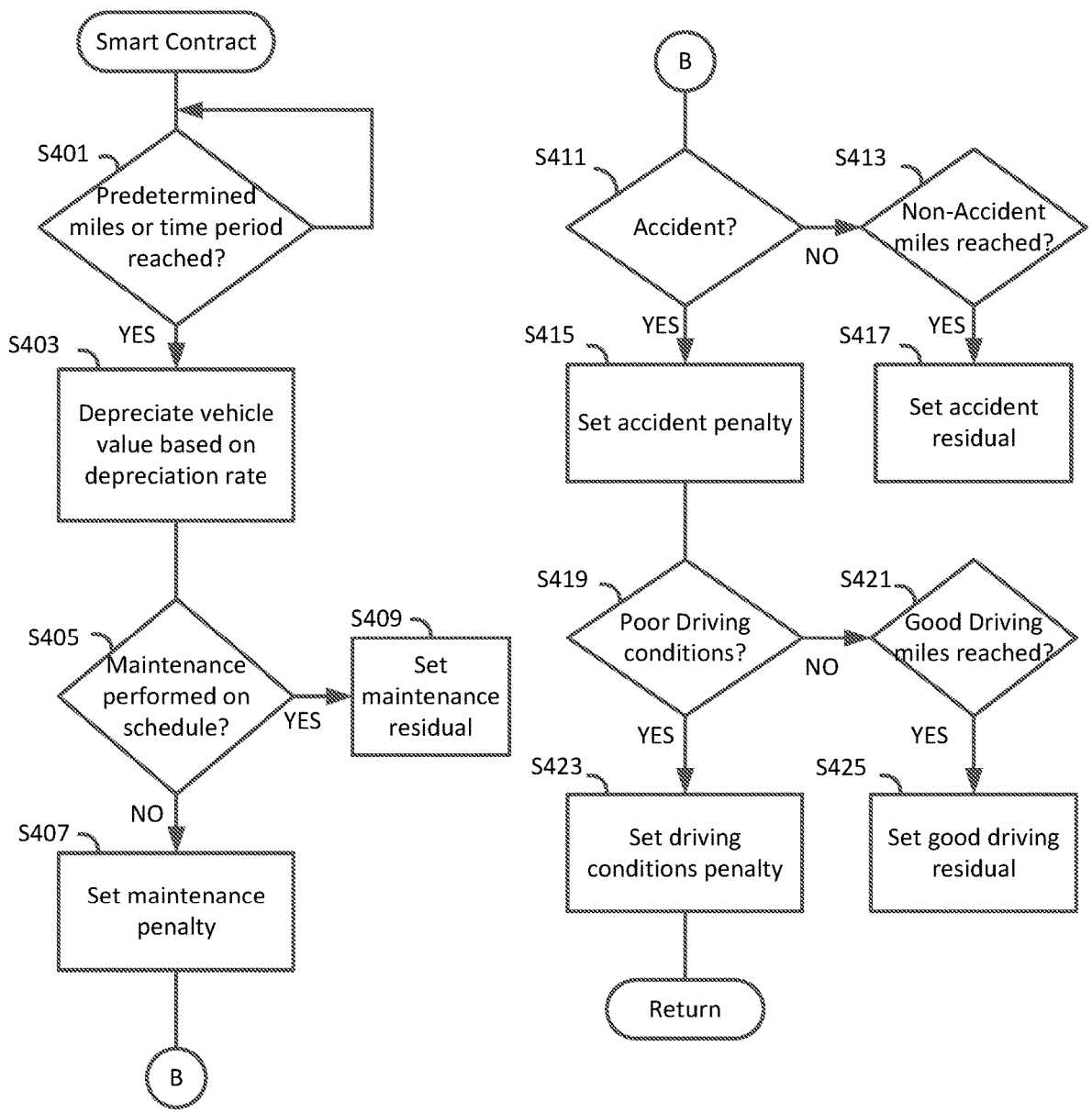
FIG. 4 is a flowchart for a smart contract.

FIG. 4 is a flowchart for a smart contract in accordance with an exemplary aspect of the disclosure. A smart contract is computer code that is typically stored at the beginning of a blockchain. The smart contract defines rules in terms of specific conditions and actions to be performed which all members of the blockchain agree to meet. The smart contract may stake vehicle tokens and residual tokens. The smart contract may be prepared in conjunction with an equipment or vehicle sale, but may also be prepared for an equipment or vehicle lease. The smart contract may include a condition that a type of vehicle or specific vehicle will depreciate by a certain value or percentage every predetermined number of miles driven, or every predetermined amount of time. The smart contract may include a maintenance schedule for a type of vehicle (year/make/model) or for a specific vehicle. The smart contract may include a dollar amount or percentage decrease that may be incurred depending on an extent of damage during an accident. The smart contract may define driving conditions. The smart contract may specify how often a vehicle is to report its state and what types of information is to be reported.

Regarding FIG. 4, a smart contract may contain a rule, S401, that checks whether a predetermined number of miles have been driven over a predetermined period since a last report. The smart contract may perform an action, S403, to depreciate a vehicle value based on a depreciation rate when the condition of a predetermined number of miles has been met. The smart contract main contain a rule, S405, which checks whether maintenance has been performed in accordance with a maintenance schedule. When maintenance is performed on schedule (YES in S405), in S409, a residual token may be provided. When vehicle maintenance is not performed on schedule (NO in S405), in S407, a token may be issued having a decreased token value. In some embodiments, a maintenance penalty may be made when a predetermined number of miles driven or a predetermined time period has passed since a last maintenance event. The smart contract may contain a rule, S411, which checks whether an accident has occurred. If no accident has occurred (NO in S411), and a total number of miles have been driven without an accident (YES in S413), in S417, a residual token may be awarded. Otherwise, in S415, an accident penalty may be applied to decrease the value of a token. In S419, the smart contract may determine that the vehicle has been driven in poor driving conditions, and, in S423, may set a driving conditions penalty to decrease a value of a token. If the vehicle has been driven in good driving conditions (NO in S419), and a total number of miles have been driven (YES in S421), in S425, a residual token may be awarded.

A smart contract may define poor driving conditions as being a case where the vehicle has experienced a certain level of vibration over a predetermined amount of time, such as a half hour. Poor driving conditions may also be fined as a high amount of vibration over a short amount of time. Instead of vibration that the vehicle has incurred, poor driving conditions may be measured by way of sudden impact received at each wheel.

Numerous modifications and variations of the present invention are possible in light of the above teachings. It is therefore to be understood that within the scope of the appended claims, the invention may be practiced otherwise than as specifically described herein.

The invention claimed is:

1. A purchased item value tracking apparatus, comprising:
a wireless communication device wirelessly communicating external to the purchased item;
authenticating co-processing circuitry authenticates the purchased item and generates one or more security keys;
processing circuitry maintaining a token linked to the purchased item that designates the purchased item as a stake in a proof of stake blockchain system, a value of the token depreciates as the purchased item depreciates,
the processing circuitry performing instructions to:
when a condition change event of the purchased item occurs, receive information of a change of state from the purchased item,
generate a message including the change of state information,
sign the message with a private key of the one or more security keys,
transmit the signed message using the wireless communication device to the blockchain system,
receive from the blockchain system updated information for the token having an updated token value determined based on a consensus in accordance with distributed contract rules and the change of state information, and
maintain the updated information for the token as the value of the purchased item,
wherein when the transmitted signed message attempts to modify the contract rules, the processing circuitry reduces the entire stake in the purchased item to zero.

2. A purchased item value tracking apparatus, comprising:
a wireless communication device wirelessly communicating external to the purchased item;
authenticating co-processing circuitry authenticates the purchased item and generates one or more security keys;
processing circuitry maintaining a token linked to the purchased item that designates the purchased item as a stake in a proof of stake blockchain system, a value of the token depreciates as the purchased item depreciates,
the processing circuitry performing instructions to:
when a condition change event of the purchased item occurs, receive information of a change of state from the purchased item,
generate a message including the change of state information,
sign the message with a private key of the one or more security keys,
transmit the signed message using the wireless communication device to the blockchain system,
receive from the blockchain system updated information for the token having an updated token value determined based on a consensus in accordance with distributed contract rules and the change of state information, and
maintain the updated information for the token as the value of the purchased item,
wherein when the transmission of the signed message attempts to modify the change of state information, the processing circuitry reduces the entire stake in the purchased item to zero.

3. The apparatus of claim 1, wherein the processing circuitry further authenticates the purchased item as a participant in a blockchain network that includes the contract rules.

4. The apparatus of claim 1, wherein the purchased item is a vehicle.

5. The apparatus of claim 4, wherein the change of state information received by the processing circuitry includes one or more of a predetermined number of miles driven by the vehicle, information of an accident involving the vehicle, information of rough road driving conditions, and information of vehicle maintenance.

6. The apparatus of claim 1, wherein the updated information for the token received by the processing circuitry includes a residual token that is added to increase the token value.

7. The apparatus of claim 6, wherein the purchased item is a vehicle, and the residual token received by the processing circuitry that is added is added in accordance with the distributed contract rules that increase the token value when one or more conditions are met including less than predetermined miles driven in a predetermined time period, no accidents involving the vehicle occur in a predetermined time period, the vehicle has been driven on unobstructed roads over a predetermined time period, and vehicle maintenance has been performed in accordance with a predetermined scheduled maintenance.

8. The apparatus of claim 4, wherein the updated information for the token value received by the processing circuitry includes a value that is subtracted in accordance with the contract rules which specify reduction in token value by a predetermined amount when the vehicle state includes a predetermined number of miles that the vehicle is driven in a predetermined period of time.

9. The apparatus of claim 5, wherein the updated information for the token value received by the processing circuitry includes a value that is subtracted in accordance with the contract rules which specify reduction in value by a predetermined amount when one or more of the change of state information occurs.

10. The apparatus of claim 1, wherein the token maintained by the processing circuitry is linked with a predetermined proportion of the purchased item.

11. The apparatus of claim 1, wherein the token maintained by the processing circuitry is linked with one or more parts of the purchased item.

12. A system for tracking and validating value of a purchased item, the system comprising:
a memory device with computer-readable program instructions stored thereon;
a wireless communication device;
processing circuitry maintaining a token linked to the purchased item that designates the purchased item as a stake in a proof of stake blockchain system, a value of the token depreciates as the purchased item depreciates,
the processing circuitry executing the instructions to:
when a condition change event of the purchased item occurs, receive information of a change of state from the purchased item,
generate a message including the change of state information,
transmit the signed message using the wireless communication device to the blockchain, choose a node of a block chain distributed network, evaluate, via the chosen node, the signed message in accordance with distributed contract rules to determine an updated token value, receive from the blockchain system the updated token value, and maintain the updated token value as the validated value of the purchased item, wherein when the transmitted signed message attempts to modify the contract rules, the processing circuitry reduces the entire stake in the purchased item to zero.

13. The system of claim 12, wherein the purchased item is a vehicle.

14. The system of claim 13, wherein the change of state information received by the processing circuitry includes one or more of a predetermined number of miles driven by the vehicle, information of an accident involving the vehicle, information of rough road driving conditions, and information of vehicle maintenance.

15. The system of claim 12, wherein the updated information for the token received by the processing circuitry includes a residual token that is added to increase the token value.

16. The system of claim 15, wherein the purchased item is a vehicle, and the residual token received by the processing circuitry that is added is added in accordance with the distributed contract rules which increase the token value when one or more conditions are met including less than predetermined miles driven in a predetermined time period, no accidents involving the vehicle occur in a predetermined time period, the vehicle has been driven on unobstructed roads over a predetermined time period, and vehicle maintenance has been performed in accordance with a predetermined scheduled maintenance.

17. The system of claim 13, wherein the updated information for the token value received by the processing circuitry includes a value that is subtracted in accordance with the contract rules which specify reduction in token value by a predetermined amount when the vehicle state includes a predetermined number of miles that the vehicle is driven in a predetermined period of time.

18. The system of claim 14, wherein the updated information for the token value received by the processing circuitry includes a value that is subtracted in accordance with the contract rules which specify reduction in value by a predetermined amount when one or more of the change of state information occurs.

* * * * *